UNITED STATES PATENT OFFICE.

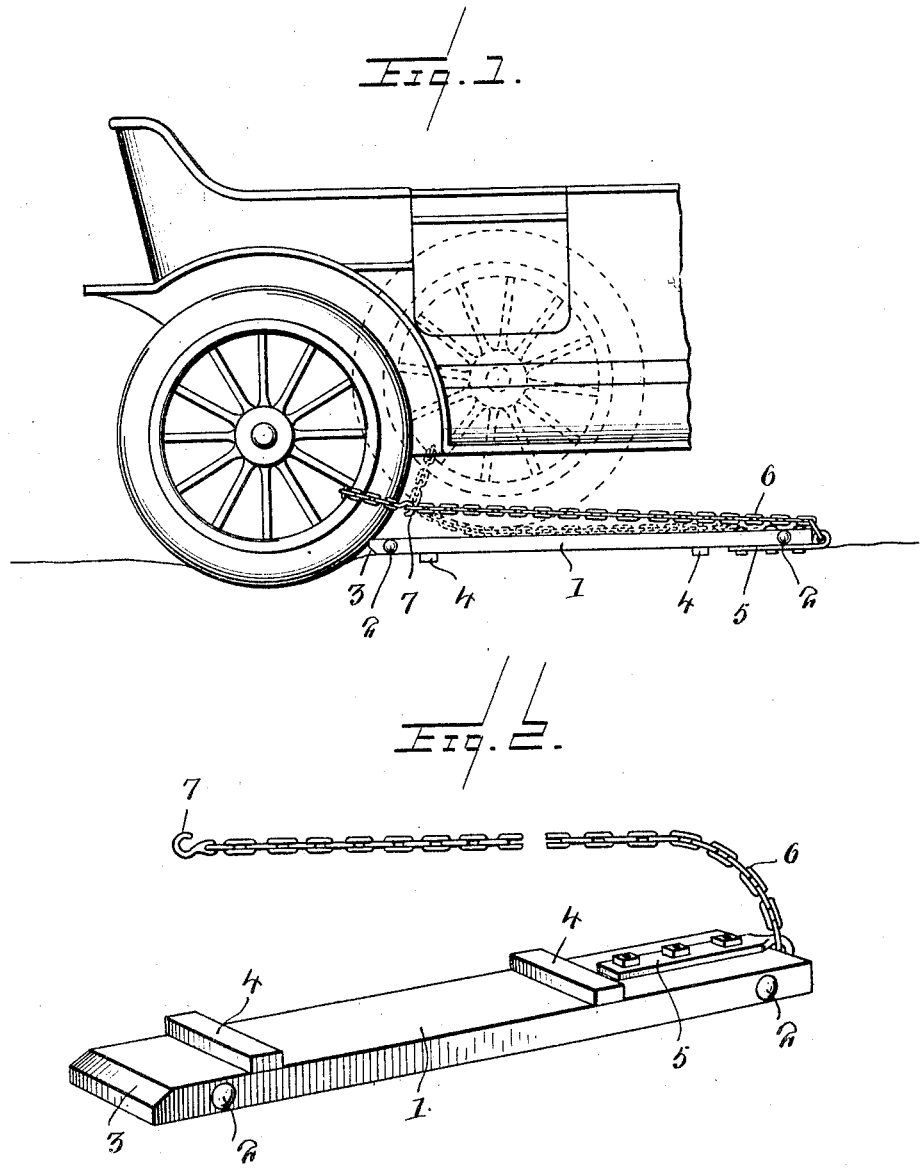

FORREST G. SMITH, OF FITCHBURG, MASSACHUSETTS.

AUTOMOBILE-SKID.

1,082,449.

Specification of Letters Patent. Patented Dec. 23, 1913.

Application filed November 30, 1912. Serial No. 734,232.

*To all whom it may concern:*

Be it known that I, FORREST G. SMITH, a citizen of the United States, residing at Fitchburg, in the county of Worcester and State of Massachusetts, have invented new and useful Improvements in Automobile-Skids, of which the following is a specification.

This invention provides means whereby an automobile may extricate itself from a depression or soft place in the roadway.

The invention consists of a skid braced and strengthened in a peculiar manner and adapted to be attached to the drive wheel so that when the engine is started the machine will draw itself from a depression or other place in the roadway in which the wheels have become sunken.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view, showing the manner of using the skid. Fig. 2 is a perspective view of the skid inverted.

Corresponding and like parts are referred to in the following description, and indicated in all the views of the drawing, by the same reference characters.

The skid consists of a plank or board 1 usually of white oak and about five feet long and one foot in width. Bolts 2 extend transversely through end portions of the plank or board and serve to prevent splitting thereof when the weight of the automobile is placed thereon. The lower rear corner of the board is beveled, as indicated at 3, to facilitate the entrance of the rear end of the skid beneath the wheel to be lifted. Cleats 4 are bolted or otherwise secured to end portions of the board and serve to prevent longitudinal movement thereof when the device is in operation. The cleats 4 are arranged upon the under side of the board and are adapted to become embedded in the surface of the road and thereby guard against longitudinal movement of the skid as well as to brace the same laterally and in conjunction with the bolts 2 to prevent splitting of the board. A clevis 5 is bolted to the front end of the board and a chain or flexible connection 6 is secured thereto at one end, said chain being usually about seven feet long and having a hook 7 at its free end. By having the flexible connection 6 consisting of a chain the hook 7 is adapted to engage a link thereof after the front portion of the chain has been engaged about the rim of the wheel.

The skid may be conveniently carried upon the machine so as to be out of the way and in the event of the machine becoming stalled by the rear wheels sinking into a rut or depression the power of the machine may be utilized to lift the machine from the depression. This is accomplished by placing the skid lengthwise of the machine and in advance of the rear wheel, with the rear end of the skid wedged under the wheel. The chain is drawn backward with s free end passed around the rim of the wheel and made secure by engaging the hook 7 with a link of the chain. Upon starting the engine and connecting the drive shaft by means of the transmission in the usual manner the wheel is caused to turn and pull itself out of the depression upon the skid. This is indicated most clearly in Fig. 1, the full lines showing the position of the parts when the skid has been applied and the dotted lines indicating the position of the wheel when riding the skid and leaving the depression which caused the machine to become stalled. It is to be understood that a skid is provided for each of the rear drive wheels.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention what is claimed as new, is:—

The herein described skid for the purposes specified, the same comprising a board having its lower rear portion beveled, bolts passed transversely through the board, transverse cleats secured to the under side of the board, a clevis attached to the front end of the board, and a chain secured at one end to the clevis and having a hook at its opposite end, said hook being adapted to engage a link of the chain after the latter has been engaged about the rim of the wheel to which the skid is fitted.

In testimony whereof I affix my signature in presence of two witnesses.

FORREST G. SMITH.

Witnesses:
HERBERT W. RIDEOUT,
PATRICK J. MCCORMACK.